United States Patent [19]
Geldmacher

[11] 3,888,121
[45] June 10, 1975

[54] TEMPERATURE MEASURING APPARATUS
[76] Inventor: Donald E. Geldmacher, 40 N. McDonald, Mesa, Ariz. 85201
[22] Filed: Mar. 6, 1973
[21] Appl. No.: 338,573

[52] U.S. Cl. ............................. 73/362 R; 73/371
[51] Int. Cl. ............................................ G01k 7/00
[58] Field of Search......... 73/362 R, 374, 376, 401, 73/398 R, 371

[56] References Cited
UNITED STATES PATENTS

| 2,018,220 | 10/1935 | Morrison | 73/362 R |
| 2,303,111 | 11/1942 | Cuyler | 73/401 |
| 2,463,510 | 3/1949 | Brasefield | 73/374 |
| 3,303,703 | 2/1967 | Wilson | 73/401 |

FOREIGN PATENTS OR APPLICATIONS

| 522,585 | 4/1955 | Italy | 73/398 R |

Primary Examiner—S. Clement Swisher
Assistant Examiner—Denis E. Corr
Attorney, Agent, or Firm—Warren F. B. Lindsley

[57] ABSTRACT

A temperature measuring apparatus employing a sensing element, a tube for convenience in measuring temperature orally, and a lighted indicating dial attached to the sensing element via the tube. The sensing element includes a multiplicity of conductive strips making electrical contact with a helical mercury canal, said canal serving as a channel for a column of mercury as it rises with increasing temperature. The conductive strips provide a practical and economical means for sensing a large number of small increments of temperature over a given temperature range.

9 Claims, 6 Drawing Figures

GND. WIRE FROM
MERCURY RESERVOIR
THROUGH CABLE

40 WIRES FROM
HELIX THROUGH CABLE

TEMPERATURE MEASURING APPARATUS

Background of the Invention

The limitations of the simple glass thermometer in which a confined column of mercury or other liquid expands with increasing temperature and in which the height of the column as read against a calibrated scale gives an indication of the measured temperature have long been recognized. Such a device is difficult to read because the liquid column has a small diameter and is obscured by reflection and refraction of light as caused by the enclosing glass column. The glass thermometer is fragile and subject to breakage. This can be especially hazardous in the case of a mercury thermometer because of the toxicity of the mercury. The accuracy with which such thermometers may be read is also not as great as may be desired.

To overcome these limitations, various improved forms of thermometers have been proposed and devised.

DESCRIPTION OF THE PRIOR ART

Heretofore there have been devised a number of such improved forms of thermometers in which one or more electrically conductive wires have been imposed through the wall of the thermometer. As the mercury column rises with temperature inside the thermometer, electrical contact is established between the wire and the mercury. This electrical contact has generally been employed to complete an electrical circuit to energize an alarm or in some other way to indicate that a particular temperature level has been reached.

Such prior art devices have not been as widely used as one might expect because of the difficulties involved in introducing the conductive wires into the mercury column. It is especially difficult to insert wires into the walls of a glass thermometer, and, for this reason, various other materials have been suggested with limited success. Furthermore, none of the prior art devices have been designed with the thought of providing a device which could be employed as an oral or rectal thermometer which could provide a continuous indication of a patient's temperature.

Because of the stated limitations of the simple thermometer which have not been overcome by prior art devices, there is a need for an improved type of thermometer.

SUMMARY OF THE INVENTION

Therefore, in accordance with the invention claimed, a new type of thermometer is provided which enhances the convenience, accuracy the safety with which any temperature of interest, including a patient's, may be read or monitored.

It is, therefore, one object of this invention to provide a new and improved thermometer for measuring temperature.

Another object of the invention is to provide a thermometer which may be easily read in a darkened room.

A further object of the invention is to provide a thermometer which permits a significant improvement in the accuracy with which the indicated temperature may be read.

A still further object of the invention is to provide a thermometer which is more resistant to accidental breakage than those in the market place.

A still further object of the invention is to provide such an improved type of thermometer which is adaptable for use in taking oral or rectal temperature measurements of a patient.

A still further object of the invention is to provide such an improved thermometer which is inexpensive to manufacture.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
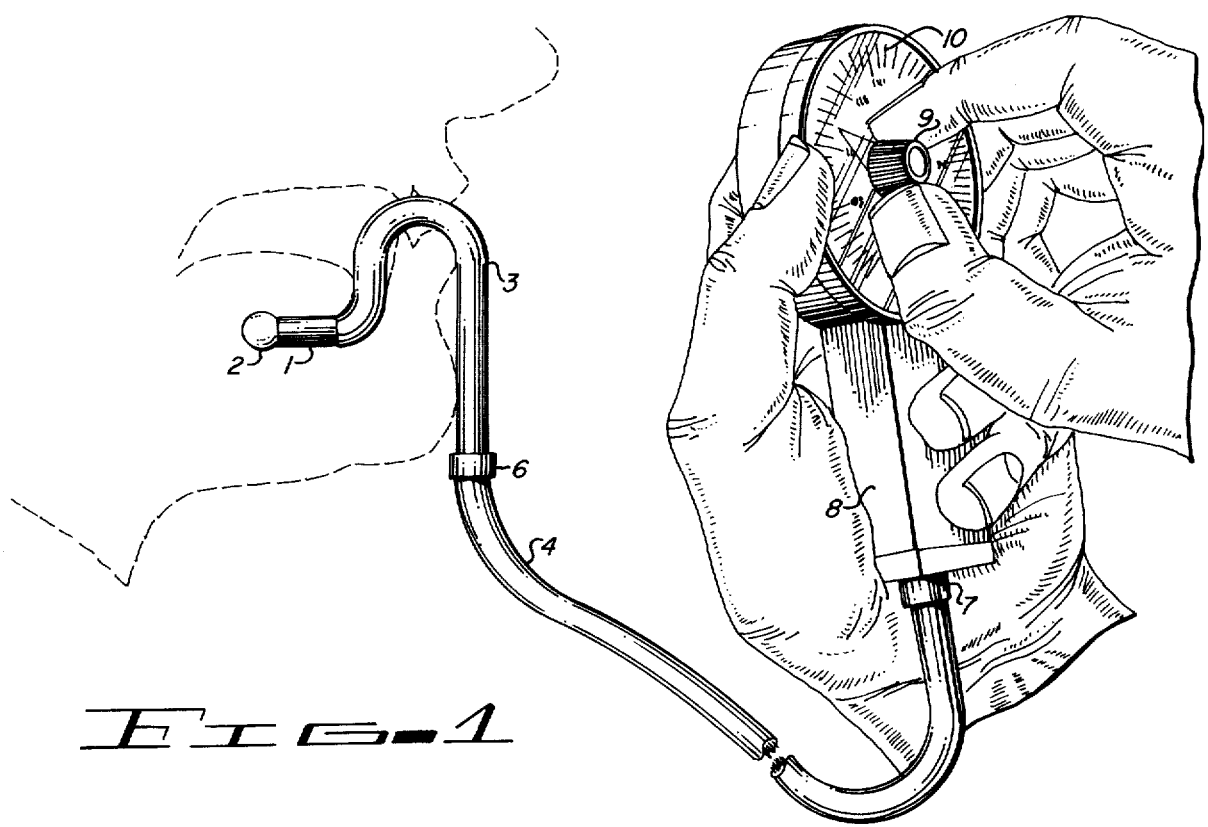
FIG. 1 is a perspective view of the disclosed temperature measuring apparatus being employed in the measurement of a patient's temperature.

Referring more particularly to the drawing by characters of reference, FIG. 1 discloses the temperature measuring apparatus being used to take an oral temperature measurement. The temperature sensing element 1 and the attached well of mercury 2 are placed under the patient's tongue. A contoured tube 3 which is shaped to the contour of the Dental arch is attached at one end to temperature sensing element 1. A flexible tube 4 is attached at one end by coupling element 6 to contoured tube 3 and at the other end by coupling element 7 to indicating assembly 5. Indicating assembly 5 is comprised of a handle and battery housing section 8, a lighted indicating dial 10 and a knob 9. The knob is rotated counter-clockwise until the concealed light becomes energized. A pointer (not shown in FIG. 1) attached to knob 9 correctly indicates measured temperature on the calibrated dial 10 in the position at which the dial first becomes illuminated.

Figure 2:
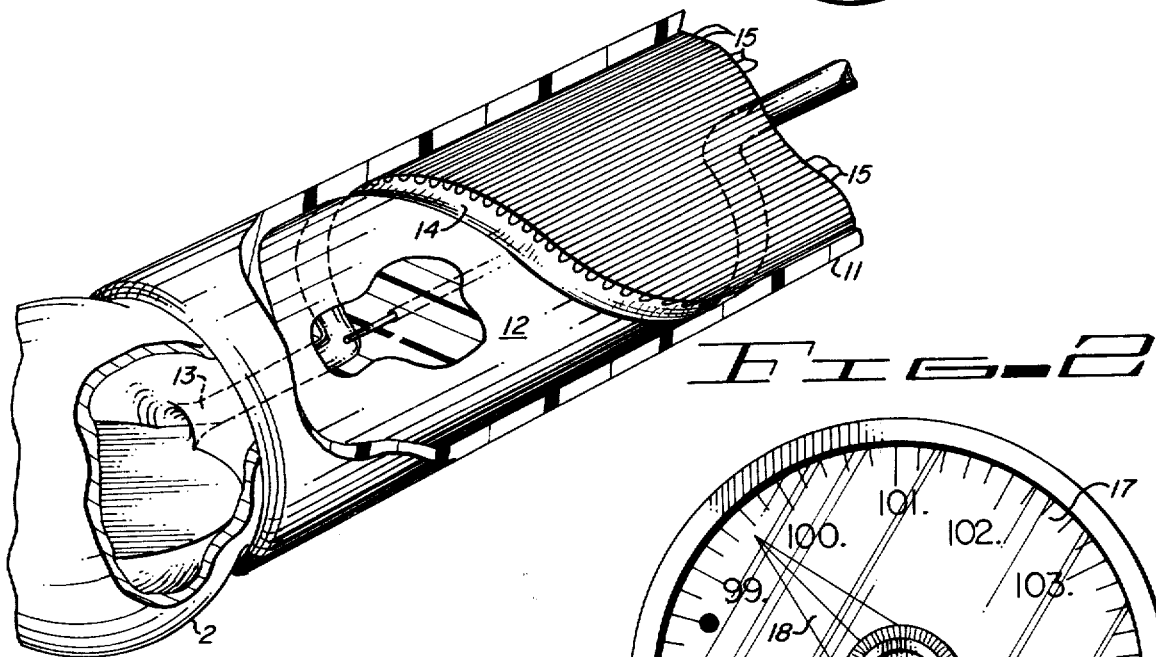
FIG. 2 is a perspective view of the temperature sensing element employed in the invention.

FIG. 2 shows the temperature sensing element 1 and attached mercury well 2. In the embodiment shown, the temperature sensing element 1 is comprised of two concentric cylinders. An outer hollow cylinder 11 encloses an inner cylinder 12. Both outer cylinder 11 and inner cylinder 12 are made of plastic or some other electrically insulating material. The inner cylinder 12 is attached to mercury well 2 and is fitted with a mercury orifice 13 which leads to mercury canal 14. Mercury canal 14 is a depression on the surface of inner cylinder 12 and traverses a helical path covering, for example, in one embodiment nearly 360° of rotation about the axis of inner cylinder 12. Other embodiments may encompass more than 360°. A multiplicity of conductive strips of which conductive strip 15 is typical are arranged about the surface of inner cylinder 12 running longitudinally, each intersecting at one end the mercury canal 14.

These conductive strips may be applied in a manner familiar to those associated with the fabrication of printed circuits. A sheet of copper or other electrically conductive material is first bonded to a non-conducting surface called a substrate. By a masking and etching process, selected areas of the copper surface are etched away, leaving the desired conductive strips. In this fashion the conductive strips may be very economically applied to the surface of cylinder 12. Outer cylinder 11 fits snugly over inner cylinder 12 to contain the mercury as it expands with temperature and thus flows from mercury well 2 into orifice 13 and on up into canal 14. At a sufficiently high temperature the mercury flowing in canal 14 makes electrical contact with conductive strip 15. A ground wire 16 is brought out within the inner cylinder such as through the axis of the inner cylinder 12 if it is of a solid configuration or along the inner surface of the inner cylinder if it is of a solid configuration and enters the mercury orifice 13 where it makes electrical contact with the mercury. It should be recognized that the ground wire may be one of the conductive strips on the outside of cylinder 12 providing it is one of the conductors at the lower range of the temperature scale below that temperature intended to be sensed. When the rising mercury makes electrical contact with conductive strip 15, an electrical circuit is completed between strip 15 and ground wire 16, which causes a light to be energized in indicator assembly 5 of FIG. 1.

Figure 3:
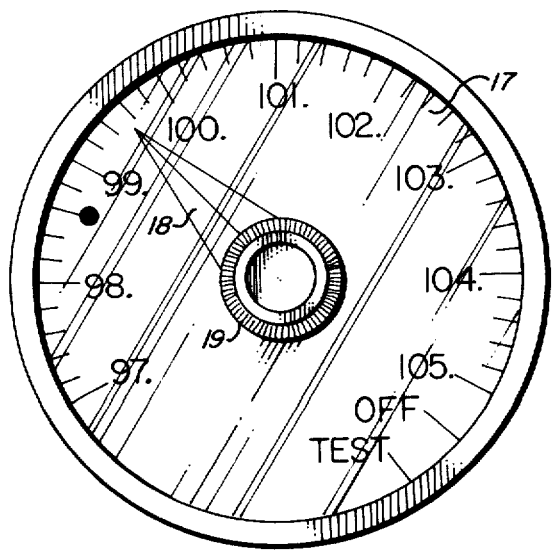
FIG. 3 is an illustration of the temperature indicator dial and pointer.

FIG. 3 shows temperature indicating dial 17, pointer 18 and knob 19. When the temperature measuring apparatus is not in use, the pointer 18, which is attached directly to knob 19, is set in the "off" or "dead" position. In this position an open circuit is guaranteed and the light source cannot be energized. In operation the pointer is first set to the "test" position. In this position the lamp is always energized and proper operation of the lamp may thus be verified. After sufficient time has been allowed for the mercury well to reach a stable temperature, the pointer 18 is then rotated counter-clockwise by means of knob 19, one step at a time, until the dial 17 becomes lighted. At this point the calibrated reading under pointer 18 represents the measured temperature.

Figure 4:
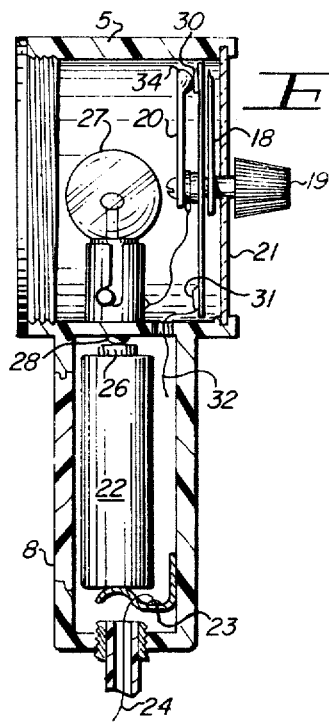
FIG. 4 is a section view of the indicator assembly.
Figure 5:
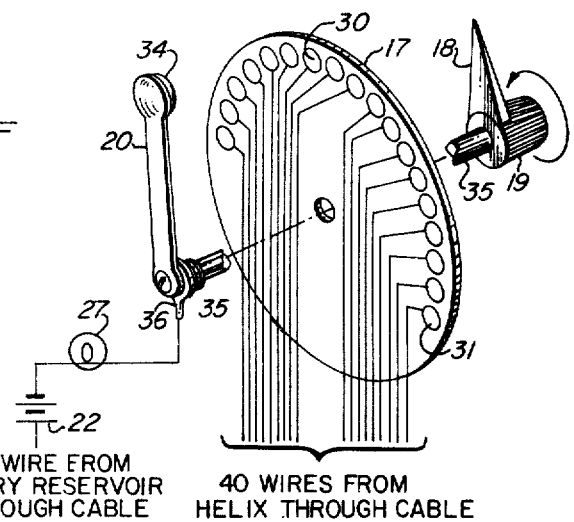
FIG. 5 illustrates in greater detail the electrical circuit and the mechanical parts associated with the indicating portion of the apparatus.

FIG. 4 is a sectional side view of the temperature indicator assembly 5. FIG. 4 shows knob 19 from one side along with an edge view of dial 17 and pointer 18. Also shown in FIG. 4 is wiper arm 20, transparent window 21, battery 22, battery ground clip 23, ground wire 24, battery terminal 26, lamp 27, lamp terminals 28 and 29, contact pads 30 and 31, and wires 32 and 33. The pointer 18 and the wiper arm 20 are secured together in a fixed orientation relative to each other and both are rigidly attached to knob 19 so that as knob 19 is rotated pointer 18 and wiper arm 20 rotate together.

Affixed to the back side of dial 17 are a number of pads, two of which are shown as pads 30 and 31. There is one such pad corresponding to each of the conductive strips, of which strip 15 of FIG. 2 is typical. In the preferred embodiment there are 40 strips and 40 corresponding pads. There are also 40 wires, of which wire 32 is typical, by means of these 40 wires, each pad is connected electrically to its corresponding strip. The 40 pads are spacedly arranged in a circle around the outer edge and on the back side of dial 30 at an appropriate radius to permit contact between the wiper contact 34 and the pads 30, 31, etc.

As the wiper 20 rotates, contact is made one at a time between wiper contact 34 and each of the 40 pads. When wiper arm 20 is rotated to the position in which wiper contact 34 rests on pad 31, an electrical circuit is established which takes the following path: wire 24 connects to battery ground clip 23, which is electrically connected to the case or ground terminal of battery 22. The other terminal 26 of battery 22 is connected to terminal 28 of lamp 27. The other terminal 29 of lamp 27 is connected by wire 33 to wiper arm 20, which wiper contact 34 makes contact with pad 31. Wire 32 connects pad 31 to a corresponding conducting strip 15 of sensing element 1 while ground wire 24 is connected to mercury reservoir 2. If the mercury in canal 14 is in contact with the appropriate strip 15 corresponding to pad 31, the electrical circuit is complete and the lamp 27 is energized. Light from lamp 27 passes through translucent dial 17, lighting its calibrated face. If the dial 18 has been rotated in a counter-clockwise direction to the first position at which the lamp 27 became energized, the pointer 17 correctly indicates the measured temperature. Further rotation in a counter-clockwise direction will leave lamp 27 energized because the mercury column in canal 14 is also in contact with all conductive strips 15 connected to lower points along canal 14.

FIG. 4 further clarifies the assembly and electrical circuit shown in FIG. 4. The forty wires are shown attached to forty corresponding pads of which 30 and 31 are typical. The forty pads are arranged in a circle on the back side of translucent dial 17. The shaft 35 securing together knob 19, pointer 18 and wiper arm 20 passes through the center of dial 17. An electrical circuit is shown passing through battery 22, lamp 27, wiper terminal 36, wiper arm 20, wiper contact 34, one of the 40 pads such as 30 or 31 and through a corresponding one of the 40 wires. Wiper terminal 36 is fixed in position but is maintained in electrical contact with shaft 35 and wiper arm 20 as shaft 35 rotates.

Figure 6:
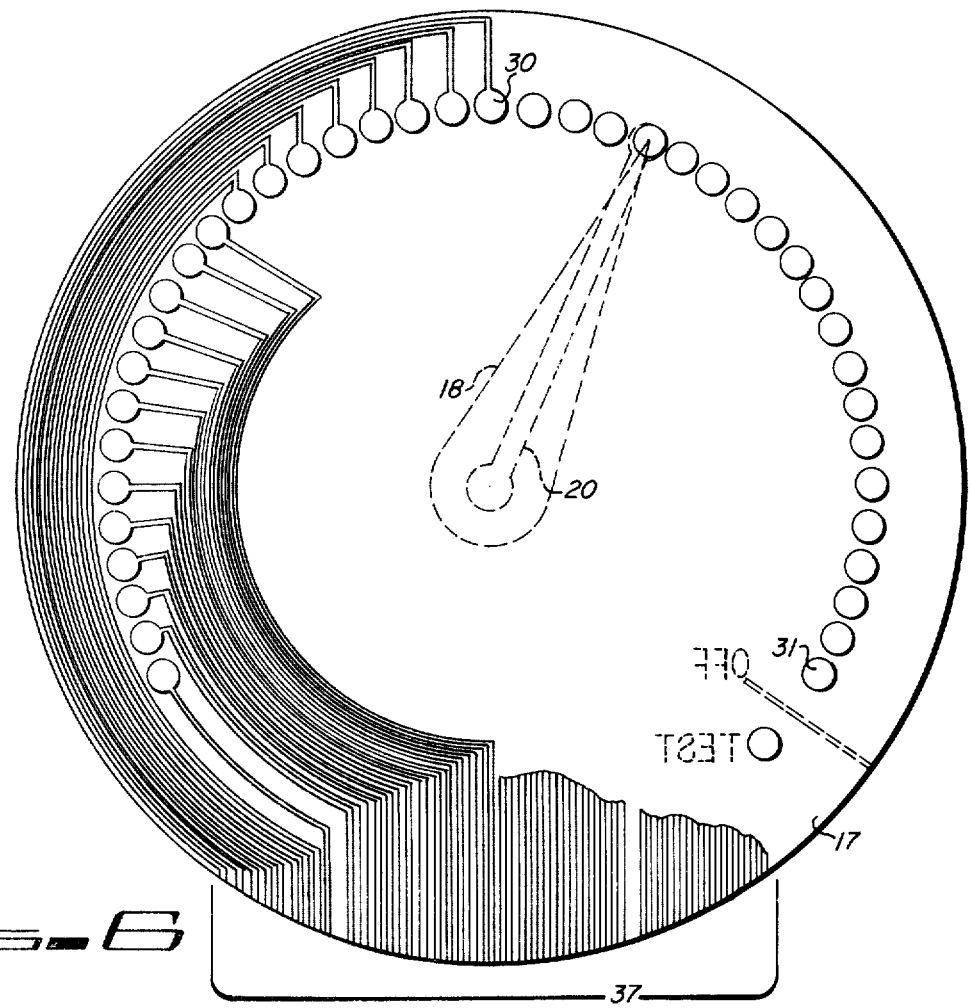
FIG. 6 illustrates the printed circuit employed as the dial of the indicator assembly in relationship with the wiper arm and the pointer.

FIG. 6 shows a rear view of the translucent dial 17 and indicates the manner in which a printed circuit may be employed for connecting the 40 wires to the 40 pads. By the masking and etching process described earlier in connection with the forming of the conductive strips on the surface of cylinder 12 of the sensing element, a system of conducting lines is formed on the back side of dial 17. This system of lines includes one line for each of the forty pads, connecting the pad to a corresponding terminal located within an arc 37 at the bottom of dial 17. The 40 terminals within arc 37 receive the forty wires which pass from their points of connection through the battery housing 8, through flexible tube 4, contoured tube 3 to sensing element 1.

In the preferred embodiment of this invention a means is provided whereby forty or more discrete temperature conditions may be detected. If the apparatus is calibrated so that these 40 temperature conditions cover a range from 97° to 105°, the increment between successive readings is 0.2°. The invention utilizes printed circuit techniques to provide conveniently for large numbers of interconnections required, thus making the apparatus both practical and economical. The lighted dial makes it possible to read the measured temperature with little effort even in a dark or dimly lighted room. The contoured design is convenient and comfortable for oral application; the device is also readily adaptable for rectal use. Because there is no need for transparency in the sensing element, a wide variety of sturdy, unbreakable materials may be considered for its construction. The foregoing objects of the invention are thus seen to be met in the apparatus described herein.

It will be immediately recognized that there are many other uses for which the apparatus and devices herein described are readily adaptable. The sensing device provides a means for supplying digital information defining a temperature condition. Such digital readout of temperature is conveniently applicable in scientific and medical experiments, processes, controls, etc. Other such uses and applications will readily be apparent to those skilled in these professions.

Although tube 3 is shown as being contoured, it may be a straight tube or of any other useable configuration. It may be formed of a plastic material which may be bent serve the needs of the user. It should also be recognized that the well of mercury may be formed in a pocket at the base or free end of the sensing element 1 on the outside of contoured tube 3 with a connection to canal 14 formed in the outer periphery of tube 3. As mentioned heretofore the ground wire may be formed on the outside of the contoured tube in the same manner as strip 15 except it will extend from the mercury well or canal 14 at the lower temperature position of the helical path of canal 14 to ground clip 23. If the helical portion of canal 14 extends for more than 360° around the circumference of cylinder, the ground conductor may be arranged to extend through cylinder 12 rather than on its surface. If the helical configuration extends more than 360° around cylinder 12 and the ground wire is placed on the outside surface of cylinder 12, it will have to be insulated where it crosses canal 14, as well known so as not to short out the mercury column.

It should be recognized that either one of the coupling elements 6 or 7 may comprise a means for calibrating the temperature sensing element by making it possible to vary the interconnection of the conductive strips on inner cylinder 12 with a different wire or conductor leading to the indicating dial 10. This can occur by designing the coupling element so as to comprise two parts each having the terminal ends of the forty interconnected wires or conductors terminating on it in an arcuate or circular configuration such as on dial 10. When the parts of the coupling element are together they can be rotated so that the rubbing terminal ends of the two groups of forty wires and/or conductors may be interconnected in various combinations by merely rotating one part of the coupling element relative to the other. In this manner one conductive strip may be connected with the conductor representing, for example, 98.4° instead of its initial reading of 98.2°.

Although but one embodiment of the present invention has been illustrated and described, it will be apparent to those skilled in the art that various changes and modifications may be made therein without departing from the spirit of the invention or from the scope of the appended claims.

What is claimed is:

1. A thermometer comprising:
a mercury filled bulb,
a temperature sensing element attached to said bulb,
said sensing element comprising a pair of concentrically arranged inner and outer cylinders,
said inner cylinder having a canal formed in its outer surface a part of which traverses a helical path about the axis of said inner cylinder,
one end of said canal being connected to said bulb,
a plurality of conductors formed on the outer surface of said inner cylinder,
one end of each of said conductors being connected to a different point along the helical part of said canal to make electrical contact with the mercury in said canal when it expands to that point,
the other end of each of said conductors extending along said inner cylinder and terminating in an indicating device,
said outer cylinder surrounding said inner cylinder in sealing arrangement to encase the mercury moving in said canal,
an indicating device,
said device comprising a plate having a plurality of contacts one connected to the other end of all but a selected one of said conductors,
means for connecting the other end of the selected one of said conductors to a voltage actuated signal device, and
a pointer on said plate connected to said voltage actuated signal device for selectively contacting the one of said contacts indicating the height of the mercury in said canal.

2. The thermometer set forth in claim 1 wherein:
said plate comprises a dial having said contacts arranged around said dial in an arcuate configuration,
said pointer comprising a knob mounted on said dial for rotation causing said pointer to selectively contact said contacts.

3. The thermometer set forth in claim 1 wherein:
said conductors comprise electrical conductors printed on the outside periphery of said inner cylinder.

4. The thermometer set forth in claim 1 wherein:
said indicating device comprises a battery connected in series with a light bulb.

5. The thermometer set forth in claim 1 wherein:
said conductors comprise electrical conductors printed on the outside periphery of said inner cylinder,
said helical path covers less than 360° of rotation about the axis of said inner cylinder, and
said selected one of said conductors being connected to the helical path at a point adjacent said mercury bulb.

6. The thermometer set forth in claim 1 wherein:
said selected one of said conductors is arranged within said inner cylinder.

7. The thermometer set forth in claim 1 wherein:
said helical path covers more than 360° of rotation about the axis of said inner cylinder, and
said selected one of said conductors is arranged within said inner cylinder.

8. The thermometer set forth in claim 1 in further combination with:
a coupling element for interconnecting first and second portions of each of said conductors, and
means for adjusting said coupling element for interconnecting the first portion of each of said conductors with a different second portion of each of said conductors for calibration purposes.

9. A thermometer comprising:
a mercury filled bulb,
a temperature sensing element attached to said bulb,
a contoured tube shaped to the contour of the dental arch attached at one end to said sensing element and at the other end to an indicating device,
said sensing element comprising a pair of concentrically arranged inner and outer cylinders,
said inner cylinder having a canal formed in its outer surface a part of which traverses a helical path about the axis of said inner cylinder,
one end of said canal being connected to said bulb,
a plurality of conductors formed on the outer surface of said inner cylinder,
one end of each of said conductors being connected to a different point along the helical part of said canal to make electrical contact with the mercury in said canal when it expands to that point,
the other end of each of said conductors extending along said inner cylinder through said contoured tube and terminating in an indicating device,
said outer cylinder surrounding said inner cylinder in sealing arrangement to encase the mercury moving in said canal,
an indicating device,
said device comprising a plate having a plurality of contacts one connected to the other end of all but a selected one of said conductors,
means for connecting the other end of the selected one of said conductors to a voltage actuated signal device, and
a pointer on said plate connected to said voltage actuated signal device for selectively contacting the one of said contacts indicating the height of the mercury in said canal.

* * * * *